(12) United States Patent
Wuggetzer et al.

(10) Patent No.: US 9,950,794 B2
(45) Date of Patent: Apr. 24, 2018

(54) PASSENGER CABIN FOR A MEANS OF TRANSPORT AND MEANS OF TRANSPORT COMPRISING A PASSENGER CABIN

(71) Applicant: Airbus Operations GmbH, Hamburg (DE)

(72) Inventors: Ingo Wuggetzer, Hamburg (DE); Christian Bruns, Hamburg (DE); Tobias Mayer, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 896 days.

(21) Appl. No.: 14/483,579

(22) Filed: Sep. 11, 2014

(65) Prior Publication Data

US 2015/0069181 A1   Mar. 12, 2015

Related U.S. Application Data

(63) Continuation of application No. PCT/EP2013/054964, filed on Mar. 12, 2013.
(Continued)

(30) Foreign Application Priority Data

Mar. 13, 2012   (DE) ................. 10 2012 005 148

(51) Int. Cl.
*B64D 11/06* (2006.01)
*B64C 1/00* (2006.01)
(Continued)

(52) U.S. Cl.
CPC ............. *B64D 11/06* (2013.01); *B61D 1/06* (2013.01); *B64C 1/00* (2013.01); *B64D 11/00* (2013.01);
(Continued)

(58) Field of Classification Search
CPC ............. B64D 11/06; B64D 11/0601; B64C 2001/0027
See application file for complete search history.

(56) References Cited

U.S. PATENT DOCUMENTS

| 1,588,906 A | 6/1926 | George |
| 4,066,227 A | 1/1978 | Buchsel |

(Continued)

FOREIGN PATENT DOCUMENTS

| DE | 826549 B | 1/1952 |
| DE | 3315171 A1 | 10/1984 |

(Continued)

OTHER PUBLICATIONS

European Patent Office, International Search Report for International Patent Application No. PCT/EP2013/054964 dated May 24, 2013.
(Continued)

*Primary Examiner* — Brian M O'Hara
(74) *Attorney, Agent, or Firm* — Lorenz & Kopf, LLP

(57) ABSTRACT

A passenger cabin for a means of transport is provided, which comprises an upper passenger deck and a lower passenger deck. The floor of the upper passenger deck comprises a lower and an upper region arranged therebeside, which are interconnected via a step or a ramp. There is an aisle in the lower region. The floor of the lower passenger deck likewise comprises a lower and an upper region arranged therebeside, between which there is a lowered aisle which is arranged so as to be laterally offset from the aisle of the upper passenger deck. The available surfaces of the upper and the lower passenger deck are mirror-symmetrically arranged. In this way, the space available can be used very effectively in order to accommodate more passengers.

19 Claims, 3 Drawing Sheets

Related U.S. Application Data

(60) Provisional application No. 61/610,209, filed on Mar. 13, 2012.

(51) Int. Cl.
    *E04D 13/04*     (2006.01)
    *B61D 1/06*     (2006.01)
    *B64D 11/00*     (2006.01)

(52) U.S. Cl.
    CPC .. *E04D 13/0409* (2013.01); *B64C 2001/0027* (2013.01); *E04D 2013/0436* (2013.01)

(56) References Cited

U.S. PATENT DOCUMENTS

| | | |
|---|---|---|
| 5,542,626 A | 8/1996 | Bueck et al. |
| 7,896,291 B2 | 3/2011 | Dehn et al. |
| 8,186,760 B2 * | 5/2012 | Kneller .................. B60N 2/002 244/118.6 |
| 8,286,914 B2 | 10/2012 | Breuer et al. |
| 2009/0283636 A1 | 11/2009 | Saint-Jalmes et al. |
| 2010/0187352 A1 * | 7/2010 | Yavilevich .............. B64C 1/061 244/36 |

FOREIGN PATENT DOCUMENTS

| | | |
|---|---|---|
| DE | 3510373 A1 | 9/1986 |
| DE | 4313502 A1 | 10/1994 |
| DE | 10306871 A1 | 10/2003 |
| GB | 880684 A | 10/1961 |
| NL | 1003137 C1 | 11/1997 |

OTHER PUBLICATIONS

German Patent Office, German Search Report for German Application No. 10 2012 005 148.4 dated Oct. 19, 2012.

European Patent Office, Written Opinion of the International Searching Authority for International Patent Application No. PCT/EP2013/054964 dated May 24, 2013.

* cited by examiner

PASSENGER CABIN FOR A MEANS OF TRANSPORT AND MEANS OF TRANSPORT COMPRISING A PASSENGER CABIN

CROSS-REFERENCE TO RELATED APPLICATIONS

This is a continuation of International Application No. PCT/EP2013/054964, filed Mar. 12, 2013, which application claims priority to German Patent Application No. 10 2012 005 148.4, filed Mar. 13, 2012 and to U.S. Provisional Patent Application No. 61/610,209, filed Mar. 13, 2012, which are each incorporated herein by reference in their entirety.

TECHNICAL FIELD

The technical field relates to passenger cabins for means of transport and to means of transport comprising passenger cabins of this type.

BACKGROUND

Passenger cabins in vehicles, i.e. means of transport, can be constructed over multiple levels. There can be multiple-level passenger cabins of this type for example in aircraft, in particular in commercial aircraft, in road vehicles, such as buses, in rail vehicles and in watercraft.

An essential aim when equipping passenger cabins in means of transportation is often to maximise the available number of seats for passengers, which is limited by the space available and the constraints specified, such as the number of seats required for crew members, the mandatory safety requirements, and the size, location and number of supply mechanisms and toilets. The ratio of passenger seats to the other mechanisms in the passenger cabin and to the size of the passenger cabin are factors which contribute to determining the profitability of the vehicle. These ratios are of significance in particular in commercial aviation.

DE 43 13 502 A1 and U.S. Pat. No. 5,542,626 describe an aircraft comprising two passenger decks arranged one above the other. In the upper passenger deck, the seats are in what is known as a two-three-two configuration having two aisles. In the lower passenger deck, the seats are in what is known as a three-three configuration having a central aisle. Owing to the large fuselage diameter, it is possible to stand upright in the aisles.

In addition, other objects, desirable features and characteristics will become apparent from the subsequent summary and detailed description, and the appended claims, taken in conjunction with the accompanying drawings and this background.

SUMMARY

According to the various teachings of the present disclosure, a transport capacity for the carriage of passengers which is distinguished by effective utilisation of space is provided.

According to one of various aspect of the present disclosure, a passenger cabin for a vehicle is specified which comprises an upper passenger deck and a lower passenger deck, between which a floor is arranged. The floor forms the floor for the upper passenger deck. This "first" floor comprises two regions (A and B), between which an aisle is arranged.

Furthermore, a lower passenger deck is provided, which is arranged below the first floor. In this lower passenger deck, two regions (C and D) are likewise provided. An aisle is arranged between these two regions.

The region A is arranged above region B, and the region D is arranged above region C. The two aisles are arranged in the y direction (that is to say in the transverse direction of the transport means) so as to be laterally offset from one another.

When viewed in cross-section, for example the regions A and D are arranged vertically one above the other and the regions B and C are arranged vertically one above the other.

In the upper passenger deck, there is a first arrangement of seats and a second arrangement of seats which is arranged to the side thereof. The two seat arrangements can comprise a plurality of rows of seats or bench seats arranged behind one another.

The seats can, for example, be attached to the floor completely or in part. It is also possible for individual seats to be attached to the floor and for other (or even all the) seats to be attached to other structural components of the passenger cabin or of the fuselage, for example to stringers and formers.

The individual seats can be attached for example to seat rails in the floor, while bench seats are attached to corresponding bracket arrangements, as shown in FIG. 4.

The floor, which is located between the two passenger decks, comprises a first region, over which, for example, the first arrangement of seats is arranged. Furthermore, it comprises a second region, over which, for example, the second arrangement of seats is arranged.

The first region (A) is arranged to the side of and above the second region (B).

The two regions can be interconnected in order to form the floor together. However, if a person moves from the second region to the first region, a height difference has to be overcome.

This height difference results in the vertical heights, in which the first arrangement of seats and the second arrangement of seats arranged to the side thereof are arranged, being different, since the seat arrangement which is arranged over the first region is likewise located above the seat arrangement which is arranged over the second region.

This directly results in the ceiling of the lower passenger deck also having two different height levels, corresponding to the height levels of the first floor region and the second floor region.

In this way, it is possible for the aisle in the upper passenger deck, which is located between the two seat arrangements, to allow for standing upright and walking (in the aisle, headroom for people of a height of greater than about 1.80 m can be provided). The first region (A) is also located to the side above the aisle and consequently comprises a smaller distance to the ceiling of the passenger cabin than the second region (B).

In the case of comparatively small dimensions of the passenger cabin, it may thus certainly be the case that it is not possible to stand upright in the first region of the upper passenger deck, while the use of the aisle, which is located in the second region between the two seat arrangements, makes it possible for adults of a height of greater than about 1.80 m to stand upright and walk. The headroom in the aisle can also be significantly above the 1.80 m stated. The same applies to the lower aisle. Between the seats, the ceiling height of the passenger deck can decrease towards the outside, such that adults of a height of greater than about 1.80 m cannot stand upright at least in the entire region between the individual rows of seats.

According to an embodiment of the present disclosure, the upper passenger deck comprises a first arrangement of seats over the first region (A).

According to one embodiment of the present disclosure, the upper passenger deck comprises a second arrangement of seats over the second region (B).

According to one embodiment of the present disclosure, the lower passenger deck comprises a third arrangement of seats over the third region (C).

According to one embodiment of the present disclosure, the lower passenger deck comprises a fourth arrangement of seats over the fourth region (D).

According to one embodiment of the present disclosure, the first aisle is arranged in the same plane as the second region (B).

According to one embodiment of the present disclosure, the second aisle is arranged in a plane below the third region (C) and below the fourth region (D).

According to one embodiment of the present disclosure, the first region is connected to the second region via one or more steps extending in the longitudinal direction of the passenger cabin, by an inclined plane or by a curved surface.

The two regions can extend over the entire region or a substantial region of the passenger cabin and are interconnected via the step, the inclined plane or a curved surface. A plurality of steps can also be provided.

The curved surface can for example extend in an S shape, such that the first region transitions continuously into the second region without an edge or a bend being provided.

According to one embodiment of the present disclosure, the aisle is located between the two arrangements of seats of the upper passenger deck. In particular, the seat division can be what is known as a single-aisle arrangement, in which only one aisle is provided in each passenger deck.

For example, the first arrangement of seats comprises a plurality of rows of two, three or four seats each which are arranged behind one another which, depending on the configuration of the attachment of the seats, can optionally be displaced in the longitudinal direction of the cabin.

According to one embodiment of the present disclosure, the second arrangement of seats comprises a plurality of bench seats and/or rows of seats which are arranged behind one another and comprise two, three or four seats each.

The bench seats can be constructed in the form of two-seater bench seats, on each of which there is space for two people.

As already described, the passenger cabin can furthermore comprise a third arrangement of seats over the third region (C) and a fourth arrangement of seats arranged to the side thereof over the fourth region (D) of the floor of the lower passenger deck. These two regions, which are denoted as "third region" (C) and "fourth region" (D), are likewise at different vertical heights. For example, the third region (C) is arranged to the side below the further fourth region (D). In this way, the available width of the fourth region (D) (in the Y direction) is optimised for possible use, for example, for accommodating seats.

According to one embodiment of the present disclosure, the third region is connected to the further, fourth region of the lower floor via an aisle extending in the longitudinal direction of the passenger cabin.

According to one embodiment of the present disclosure, the floor region of this aisle is arranged below and between the surfaces of the two (third and fourth) regions.

In this way, it can be ensured that standing upright and walking is also possible in the aisle of the lower passenger deck. When viewed in cross-section, the two aisles (the lower and the upper aisle) are horizontally (in the direction of the Y axis, that is to say the horizontally extending transverse axis of the transport means) displaced, that is to say arranged so as to be vertically offset from one another.

The upper aisle is arranged below the first, higher region (A) of the upper passenger deck, such that the distance to the ceiling is maximised.

According to one embodiment of the present disclosure, the seat configuration of the upper passenger deck and the arrangement of the aisle are mirror-symmetric to the seat configuration and the arrangement of the aisle of the lower passenger deck.

If, for example, the upper passenger deck has a two-three seat configuration, then the lower passenger deck has a three-two seat configuration, the two aisles being arranged so as to be laterally offset from one another. This arrangement requires, based on the respective aisles, the respectively raised regions (A and D) in the Z direction (that is to say in the vertical direction) and the two lowered regions (B and C) in the Z direction to lie one above the other. The lower aisle is thus located below the first, higher region (A), while the first, upper aisle is arranged directly over the third, lower region (C) of the lower passenger deck.

According to one of various aspects of the present disclosure, a vehicle comprising a passenger cabin as described above and below is specified.

According to one embodiment of the present disclosure, the vehicle is an aircraft, for example, a passenger aircraft. The passenger aircraft can, for example, be constructed as a medium-haul or short-haul aircraft.

According to one embodiment of the present disclosure, the vehicle is a short-haul or medium-haul aircraft having a fuselage diameter of at most 4.5 meters.

It may be considered a central concept of the present disclosure that the space available in the passenger cabin is optimally utilised, by the floor, which is located between the lower passenger deck and the upper passenger deck, comprising two regions which are arranged side by side, extend in the longitudinal direction of the passenger cabin and are at different vertical heights. Likewise, the lower floor of the lower passenger cabin comprises two regions of this type, which are however arranged so as to be substantially a mirror image of the two upper regions. As a result, there is a lateral offset of the two central aisles of the upper passenger deck and of the lower passenger deck (in the case of a seat configuration having only one aisle on each deck). In this way, it may be ensured that it is possible to stand upright and walk in each of the two aisles.

Owing to the arrangement of the height levels of the different floor regions and aisles, it is possible to provide a relatively large amount of available floor surface on the passenger deck, on which passenger seats or other internal equipment can then be arranged. In this way, in the case of the same number of seats and the same seat dimensions, the number of available passenger seats can be kept constant if the fuselage diameter is reduced. The fuselage diameter can thus be reduced to about 3.95 m.

At this point, it should be noted that the fuselage cross-sections of the vehicles, and in particular of the aircraft, can be circular or approximately circular, for example oval, as shown in FIGS. 1 and 2, and 3 and 8 respectively. Advantageously, the fuselage cross-sections which are used are consequently not rectangular or square.

Despite this comparatively very small fuselage diameter, full headroom can be achieved in the aisle region both in the upper passenger deck and in the lower passenger deck. This "full headroom" is, for example, about 1.95 m.

In this case, the aisles are laterally offset from one another and are arranged in the region of or close to the vertically extending "plane of symmetry" of the transport means.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description. In addition, the illustrations in the figures are schematic and are not to scale.

Figure 1:
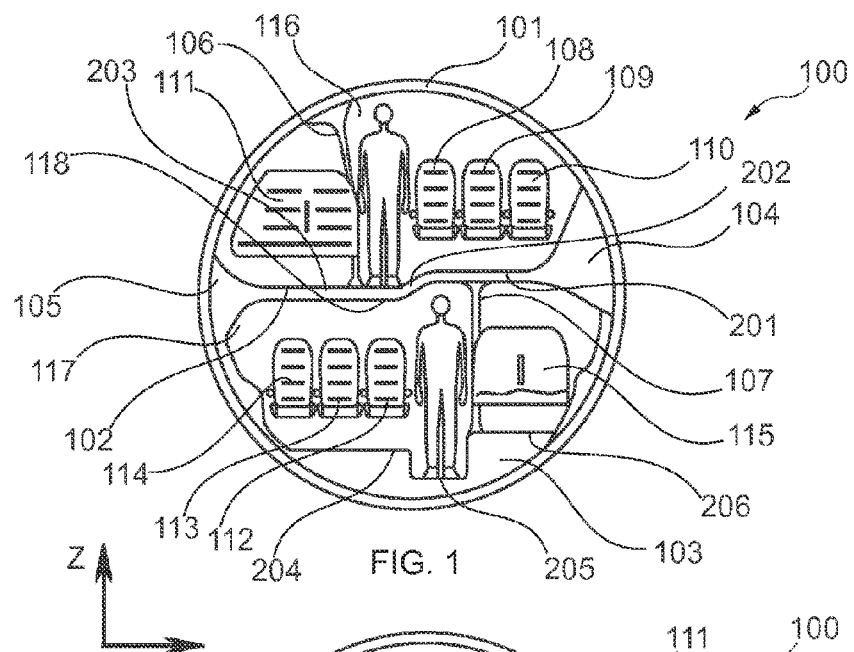
FIG. 1 is a cross-section through a passenger cabin according to an embodiment of the present disclosure.

FIG. 1 is a cross-section through a passenger cabin of a transport means according to an embodiment of the present disclosure. At this point, it should be pointed out that the viewing direction of the views in FIGS. 1, 2, 3 and 8 extends opposite to the main movement direction of the transport means (in the case of an aircraft, to the direction of flight), that is to say in a negative x direction. The y direction extends transverse to the direction of flight in the horizontal plane and the z direction extends transverse to the direction of flight in the vertical plane, as indicated by the coordinate axes in FIGS. 1, 7 and 8.

The passenger cabin comprises an outer shell 101, which can comprise, for example, spars, formers, further structural components and an outer skin. In the case of an aircraft passenger cabin, the passenger cabin can form part of the fuselage of the aircraft. The passenger cabin can have a circular or largely circular, but also an oval or other shaped, cross-section.

An upper passenger deck 116 and a lower passenger deck 117 are located inside the passenger cabin. These two passenger decks are separated from one another by a floor 102 arranged therebetween. The floor 102 serves as a floor of the upper passenger deck 116. The lower passenger deck 117 comprises a separate floor 103.

The upper floor 102 comprises a first, higher region 201 and second, lower region 203 arranged therebeside. These two regions are interconnected via a step-like, oblique surface 202.

The connecting surface 202 can be constructed in the form of one or more vertical steps, in the form of an oblique surface or in the form of a continuous curved transition.

A plurality of rows of individual seats or a plurality of bench seats 111 arranged behind one another are located over the lower region 203, for example in the form of two-seater bench seats. A central aisle region 118 is located therebeside, beside which a plurality of rows of individual seats 108, 109, 110 are arranged over the higher region 201. For example, there are two, three or four individual seats side by side here. Of course, there can also be bench seats in this region, for example, two-seater, three-seater and/or four-seater bench seats. On the bench seats 111, 115, there may, for example, be space for two people side by side. This increases comfort. The bench seats 111 offer the operator of the aircraft new marketing opportunities with respect to the individualisation of the seat product range.

The bench seats 111 can be attached on one side to the supporting structure of the wall 101 of the passenger cabin 100 and on the other side to, for example, substantially vertical support elements 106.

Figure 4:
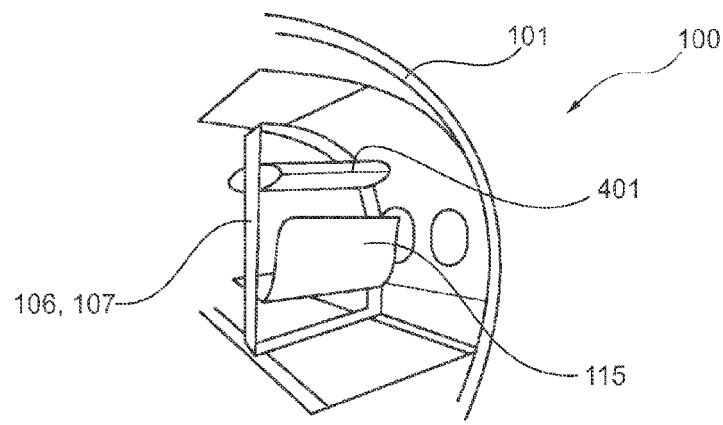
FIG. 4 shows a region of a passenger cabin comprising a bench seat which is suspended in a bracket-like structure.

Alternatively, peripheral, bracket-like supports 107, 106 can also be provided, as shown in FIG. 4. Supports affixed in the ceiling region can also be provided.

On the left-hand side 105, the upper floor 102 extends apart upwards and downwards such that it can form a channel-shaped cavity 301 (see FIG. 3) here. Likewise, on the right-hand side 104, it extends apart upwards and downwards such that it can also form a channel-shaped cavity 302 (see FIG. 3) here. In this way, the stability of the passenger cabin and the entire fuselage can be increased.

In these channels, for example pipes, cables or other supply mechanisms can be guided and mounted. Lines and pipes of this type thus must not be arranged in other regions of the floor or in the ceiling region, since this would mean that floor and ceiling elements of a lower height would have to be used.

It is thus not required for systems technology to be arranged in the ceiling region and floor region of the cabin, whereby the space available in the head region of the passengers can be further increased.

In the lower passenger deck 117, a plurality of rows of individual seats 112, 113, 114 and/or bench seats 115 are likewise arranged.

The seats and/or the bench seats are arranged for example mirror-symmetrically to the arrangement of the seats and/or bench seats in the upper passenger deck.

With respect to FIG. 1, for the lower passenger deck, this means that rows of individual seats are arranged behind one another on the left-hand side (that is to say on the starboard side in the direction of flight (x direction)), while rows of two-seater bench seats are arranged on the right-hand side (on the port side in the direction of flight).

In the upper passenger deck, however, this arrangement is exactly reversed. Here, the arrangement of the two-seater bench seats behind one another is located on the starboard side and the rows of individual seats are located on the port side.

Of course, instead of the individual seats, bench seats or a mixture of bench seats and individual seats can also be provided. Instead of the bench seats, individual seats can also be provided.

The individual seats 108, 109, 110 and 112, 113, 114 can be attached to seat rails extending in the longitudinal direction and thus can be displaced in the longitudinal direction of the passenger cabin in order to change the distance between the individual seat rows. In this way, the operator of the aircraft can flexibly adjust the seating configuration according to the respective market conditions.

The lower floor 103 is divided into three regions. The left-hand region 204 comprises a surface which is located at a first vertical height. The rows of individual seats 112, 113, 114 are located over this region 204.

The central aisle 205 is located therebeside, the top of which is lower than the top of the left-hand region 204. Beside the aisle 205, to the right, there is a further region 206, the top of which is laterally beside and above the top of the left-hand region 204. The row of bench seats 115 is located thereabove. The central aisle 205 is thus below the level of the floors 204, 206 and is thus a lowered aisle.

In comparison thereto, the upper aisle of the upper passenger deck 116 is not lowered, but is on the same level as the top of the left-hand floor region 203.

Figure 2:
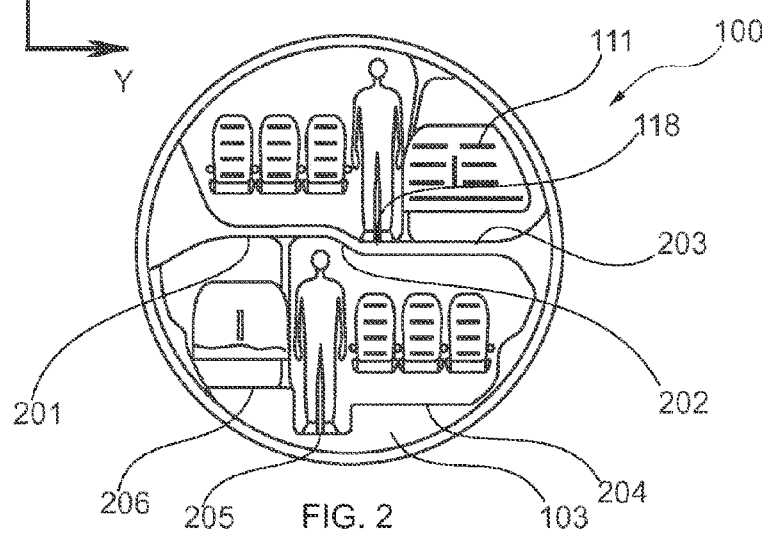
FIG. 2 is a cross-section through a passenger cabin according to an embodiment of the present disclosure.

The arrangement in FIG. 2 is a mirror image of the arrangement in FIG. 1. Therefore, the following applies to FIG. 2: the higher region 201 of the floor of the upper passenger deck 116 is on the left-hand side (that is to say on the starboard side in the direction of flight), while the lower region 203 is on the right-hand side (on the port side in the direction of flight). Furthermore, the higher region 206 of the lower floor 103 of the lower passenger cabin 117 is accordingly on the starboard side, while the lower region 204 of the floor 103 is on the port side. The lowered aisle 205 is located therebetween.

The bench seats 111 of the upper passenger deck can be accessed directly from the central aisle 118. The individual seats 108, 109, 110 are accessed from the aisle by the passenger climbing up the steps or the ramp 202 (see FIG. 2).

The bench seats 115 and the individual seats 112, 113, 114 of the lower passenger deck are accessed from the aisle by taking a step up, since the aisle floor of the central aisle 205 is below the floor level of the regions under the seats.

It can be provided that the bench seats cannot be displaced in the longitudinal direction of the vehicle. However, they offer the advantage of the passenger enjoying more freedom in the transverse direction (Y direction), since the bench seats are wider than an individual seat.

This can be advantageous in particular for larger people. This can also be advantageous for people who have to work or adults travelling alone with small children.

A possibility for attaching the bench seats is described for example in WO 2007/73938 A1.

Figure 3:
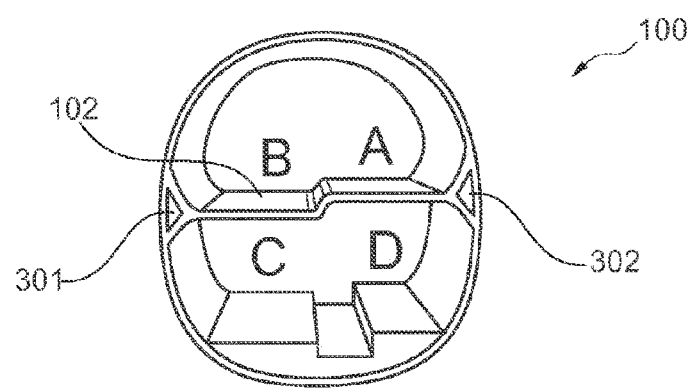
FIG. 3 shows a segment of a passenger cabin without internal equipment according to an embodiment of the present disclosure.

FIG. 3 shows a fuselage segment of an aircraft fuselage. A plurality of fuselage segments of this type can form a passenger cabin 100 and a complete aircraft fuselage. In particular, FIG. 3 shows the cavities 301, 302 of the upper floor 102 extending in the longitudinal direction of flight.

The passenger cabin can be constructed in one example, in the form of an aircraft passenger cabin for short-haul or medium-haul aircraft having a single aisle in each of the two passenger decks.

Owing to the geometry, according to the present disclosure, of the passenger cabin, the volume provided by the fuselage can be utilised very effectively, in order to accommodate as many passengers as possible. In particular, this geometry makes it possible to also arrange two passenger decks which are positioned above one another in relatively small fuselage diameters of about 4.5 m or even less, for example about 3.95 m.

Figure 8:
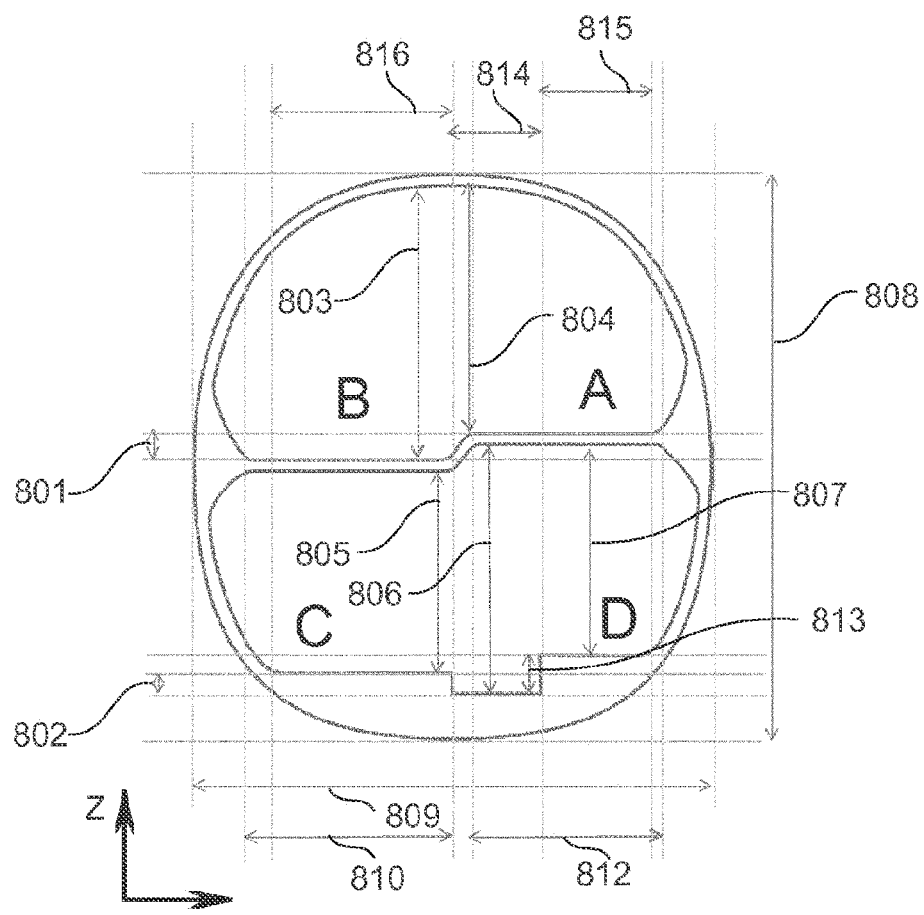
FIG. 8 is a cross-section through a passenger cabin according to an embodiment of the present disclosure.

In FIGS. 3 and 8, the raised region of the upper passenger deck is denoted by A and the lower region of the upper passenger deck is denoted by B. The lower region of the lower passenger deck is denoted by C and the higher region of the lower passenger deck is denoted by D.

FIG. 4 is a representation of a region of an upper passenger deck. The individual bench seats 115 are suspended in a peripheral support element 106 or 107. This support element 116, 107 can also receive a PSU module 401, in which lighting, air conditioning outlets, an emergency oxygen supply and display means are situated.

For example, no overhead luggage stowage compartments (hatracks) or other storage compartments or boxes are provided within the direct seating region of the passenger cabin, since these would use space which is intended to be available for passengers. Hand luggage can be stored, for example, in a central boarding region. For this purpose, a peripheral luggage conveying means can be provided which runs annularly around the cabin. This can be seen in FIG. 5. The luggage conveying means comprises, for example, four conveying rings 501, 502, 503, 504 arranged side by side which can rotate about their axes of symmetry (this corresponds to the longitudinal axis of the cabin of the transport means). Conveying means of this type are described for example in DE 10 2009 012 998 A1.

Alternatively, lateral storage compartments or boxes can also be provided in the central boarding region in order to receive the hand luggage of the passengers and crew. A separate luggage storage space can also be provided.

Figure 5:
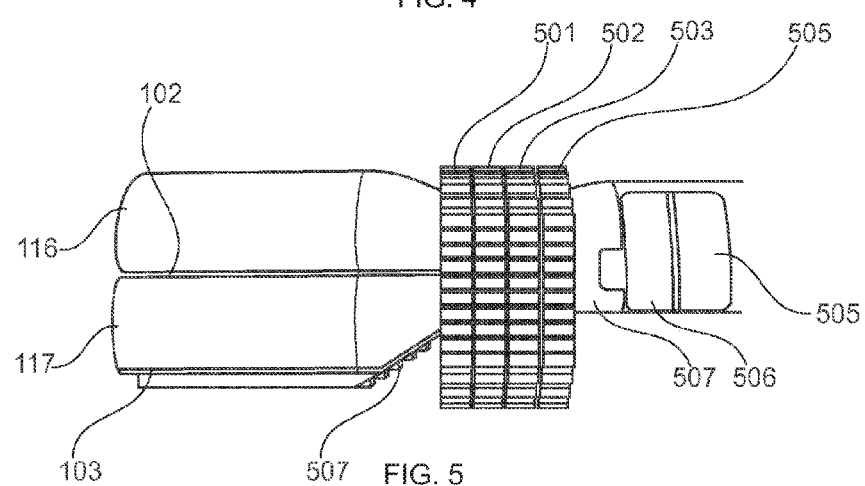
FIG. 5 is a side view of a region of a passenger cabin according to an embodiment of the present disclosure.

As shown in FIG. 5, the upper passenger deck 116 and the lower passenger deck 117 do not extend over the entire length of the passenger cabin. The two regions are separated from one another by the floor 102. In order to reach the lower passenger deck 117 from the central boarding region 508, which can be accessed via the double doors 505, 506, steps 507 are provided which lead from the central boarding region 508 down into the region of conveying means 501, 502, 503, 504. Double doors of this type are described for example in US 2009/0173825. The upper passenger deck 116 is also accessed from the central boarding region 508 via one or more steps (not shown in FIG. 5), since the floor 102 of the upper passenger deck is at a higher level than the floor of the central boarding region 508.

Figure 6:
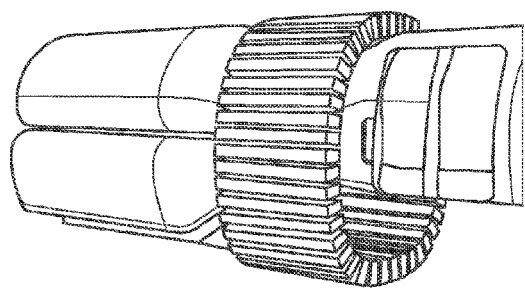
FIG. 6 is a further view of a region of a passenger cabin according to an embodiment of the present disclosure.

A hold can be located below the central boarding region 508. FIG. 6 is a further view of the region of the passenger cabin which can also be seen in FIG. 5.

In this embodiment, the conveying means does not comprise four conveying rings 501, 502, 503, 504 arranged side by side, but one single conveying ring which is correspondingly wider. The conveying means is arranged around the entire passenger cabin and can rotate about its longitudinal axis, and therefore the individual containers can be loaded or unloaded in succession.

Figure 7:
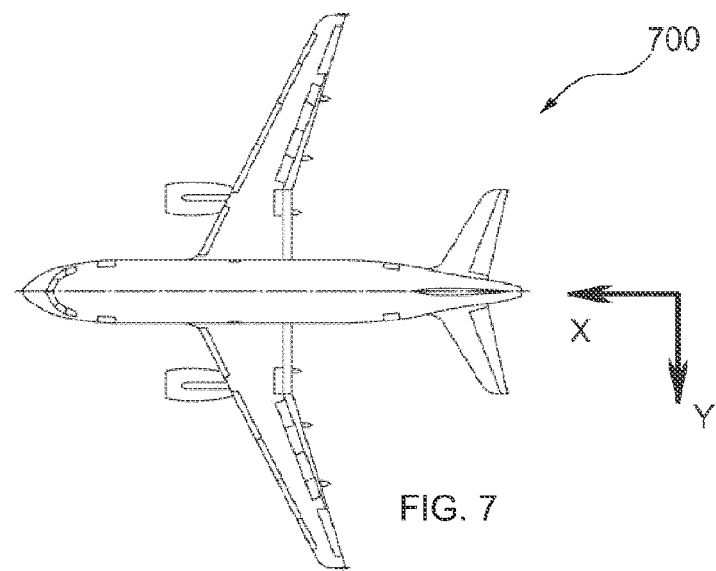
FIG. 7 shows an aircraft comprising a passenger cabin according to an embodiment of the present disclosure.

FIG. 7 shows an aircraft 700 comprising a passenger cabin according to an embodiment of the present disclosure.

The above-described passenger cabin can be used for example in medium-haul or short-haul aircraft. Owing to the skilful utilisation of the space available, more passengers can be transported than is the case in known arrangements. As a result, efficiency is increased.

In order to increase safety, shock-absorbing structures can be integrated into or affixed to the fuselage, as described in DE 43 13 592 A1. These structures can be arranged, for example, in the region of the lower shell of the fuselage.

FIG. 8 is a cross-section through a passenger cabin which can be used for the seat configurations shown in FIGS. 1 and 2.

At this point, it should be noted that instead of a double seat or even instead of individual seats arranged side by side, another piece of internal equipment can be provided instead of the seats, for example, one or more sleeping berths or also even a workspace. This workspace can, for example, comprise a computer terminal at which the passenger can work. It is possible to select a configuration of this type such that the passenger can stand in the aisle while working and operate the computer from there. In one example, the height of the corresponding floor region can be adapted to the use thereof. If, for example, there is a double seat in the region D of the lower passenger deck, the level of this floor region can be arranged as shown in FIG. 8. If, however, there is a workspace for an individual in this region, the region could also be at a lower height level, whereby the distance from a floor to the ceiling, that is to say to the underside of the upper floor, can be increased.

In principle, it is desirable for the height in one region in which a passenger sits, that is to say between floor and ceiling, to be at least about 1360 mm. Typical aisle widths in what are known as single-aisle aircraft are between about 4495 mm and about 5463 mm. Typical seat widths in the case of three seats arranged side by side in a single-aisle aircraft are between about 1518 mm and about 1557 mm.

The geometry shown in FIGS. 3 and 8 can, for example, have the following dimensions: Height difference 801 between the first region A and the second region B of the floor of the upper passenger deck is about 200 mm; maximum distance from the floor to the ceiling 804 in the first region (A) of the upper passenger deck is about 1870 mm; maximum distance from the floor to the ceiling 803 in the second region B of the upper passenger deck is about 2050 mm; distance from the lower floor to the underside of the upper floor 805 in the third region C is about 1580 mm; distance from the lower floor to the ceiling 807 in the fourth region D of the lower passenger deck is about 1640 mm; maximum distance to the ceiling in the lower aisle region 806 is about 2000 mm; height difference 813 between the level of the floor of the fourth region D and of the lower aisle floor is about 300 mm; height difference 802 between the level of the floor of the third region C and of the lower aisle floor is about 170 mm; the width of the fuselage 809 is about 4000 mm; width of the first region A of the upper passenger deck 812 is about 1450 mm; width of the second region B of the upper passenger deck 810 is about 1500 mm; width of the third region C of the lower passenger deck 816 is about 1450 mm; width of the fourth region D of the lower passenger deck 815 is about 880 mm; width of the lower aisle 814 is about 680 mm; and height of the fuselage 808 is about 4340 mm.

The above-mentioned dimensions are provided by way of example for an approximately circular or oval fuselage cross-section. Depending on the configuration of the passenger deck, the shape of the fuselage cross-section and of the fuselage diameter other dimensions can be used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A passenger cabin for a means of transport, comprising:
   an upper passenger deck, which comprises a first floor comprising a first, higher region laterally connecting to a first outer shell segment, a second, lower region laterally connecting to a second outer shell segment and a first aisle arranged between the first region and the second region, the second outer shell segment being opposite to the first outer shell segment;
   a lower passenger deck, which is arranged below the first floor and comprises a second floor comprising a third, lower region laterally connecting to the second outer shell segment, a fourth, higher region laterally connecting to the first outer shell segment and a second aisle arranged between the third region and the fourth region, the second aisle arranged below a level of the third region and below a level of the fourth region;
   wherein the first region is arranged to the side of and above the second region, the third region is arranged to the side of and below the fourth region, the first aisle is arranged so as to be laterally offset from the second aisle, and the second region of the upper passenger deck and the third region of the lower passenger deck are arranged so as to lie one above the other, and the first region of the upper passenger deck and the fourth region of the lower passenger deck are arranged so as to lie one above the other.

2. The passenger cabin according to claim 1, wherein the upper passenger deck comprises a first arrangement of seats over the first region.

3. The passenger cabin according to claim 1, wherein the upper passenger deck comprises a second arrangement of seats over the second region.

4. The passenger cabin according to claim 1, wherein the lower passenger deck comprises a third arrangement of seats over the third region.

5. The passenger cabin according to claim 1, wherein the lower passenger deck comprises a fourth arrangement of seats over the fourth region.

6. The passenger cabin according to claim 1, wherein the first aisle is arranged in the same plane as the second region.

7. The passenger cabin according to claim 1, wherein the first region is connected to the second region via one or more steps extending in the longitudinal direction of the passenger cabin, an inclined plane or a curved surface.

8. The passenger cabin according to claim 2, wherein the first arrangement of seats comprises a plurality of rows of three seats each of which are arranged behind one another.

9. The passenger cabin according to claim 3, wherein the second arrangement of seats comprises a plurality of bench seats arranged behind one another.

10. The passenger cabin according to claim 1, wherein a seat configuration of the upper passenger deck is mirror-symmetric to a seat configuration of the lower passenger deck.

11. A means of transport, comprising:
    a passenger cabin including:
    an upper passenger deck, which includes a first floor having a first region laterally connecting to a first outer shell segment, a second region laterally connecting to a second outer shell segment and a first aisle arranged between the first region and the second region, the second outer shell segment being opposite to the first outer shell segment;

a lower passenger deck, which is arranged below the first floor and includes a second floor having a third region laterally connecting to the second outer shell segment, a fourth region laterally connecting to the first outer shell segment and a second aisle arranged between the third region and the fourth region, the second aisle arranged below a level of the third region and below a level of the fourth region;

wherein the first region is arranged to the side of and above the second region, the third region is arranged to the side of and below the fourth region, the first aisle is arranged so as to be laterally offset from the second aisle, and the second region of the upper passenger deck and the third region of the lower passenger deck are arranged so as to lie one above the other, and the first region of the upper passenger deck and the fourth region of the lower passenger deck are arranged so as to lie one above the other.

12. The means of transport according to claim 11, wherein the means of transport is an aircraft.

13. The means of transport according to claim 11, wherein the means of transport is a short-haul or medium-haul aircraft having a fuselage diameter of at most 4.5 meters.

14. The means of transport according to claim 11, wherein the upper passenger deck comprises a first arrangement of seats over the first region.

15. The means of transport according to claim 11, wherein the upper passenger deck comprises a second arrangement of seats over the second region.

16. The means of transport according to claim 11, wherein the lower passenger deck comprises a third arrangement of seats over the third region.

17. The means of transport according to claim 11, wherein the lower passenger deck comprises a fourth arrangement of seats over the fourth region.

18. The means of transport according to claim 11, wherein the first aisle is arranged in the same plane as the second region.

19. The means of transport according to claim 15, wherein the second arrangement of seats comprises a plurality of bench seats arranged behind one another.

* * * * *